(12) United States Patent
Blumenthal

(10) Patent No.: US 11,579,900 B2
(45) Date of Patent: *Feb. 14, 2023

(54) METHOD AND CONTROL UNIT FOR CONFIGURING AN ADDON INTERFACE

(71) Applicant: Scania CV AB, Södertälje (SE)

(72) Inventor: Carl Blumenthal, Nyköping (SE)

(73) Assignee: Scania CV AB, Södertälje (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/957,569

(22) PCT Filed: Dec. 11, 2018

(86) PCT No.: PCT/SE2018/051278
§ 371 (c)(1),
(2) Date: Jun. 24, 2020

(87) PCT Pub. No.: WO2019/132752
PCT Pub. Date: Jul. 4, 2019

(65) Prior Publication Data
US 2020/0326958 A1    Oct. 15, 2020

(30) Foreign Application Priority Data
Dec. 27, 2017 (SE) .................... 1751653-5

(51) Int. Cl.
*G06F 9/445* (2018.01)
*G06F 8/65* (2018.01)
*H04L 12/40* (2006.01)

(52) U.S. Cl.
CPC ............ *G06F 9/44526* (2013.01); *G06F 8/65* (2013.01); *G06F 9/44505* (2013.01);
(Continued)

(58) Field of Classification Search
None
See application file for complete search history.

(56) References Cited

U.S. PATENT DOCUMENTS 6,272,402 B1* 8/2001 Kelwaski
8,880,654 B2 11/2014 Zachos
(Continued)

FOREIGN PATENT DOCUMENTS

WO    2015012961 A1    1/2015

OTHER PUBLICATIONS

Scania CV AB, International Application No. PCT/SE2018/051278, International Preliminary Report on Patentability, dated Jun. 30, 2020.
(Continued)

*Primary Examiner* — Syed A Roni
(74) *Attorney, Agent, or Firm* — Moore & Van Allen PLLC; W. Kevin Ransom

(57) ABSTRACT

A method and control unit for configuring an add-on interface of a vehicle are presented. The vehicle comprises at least one vehicle internal system, at least one add-on system, the add-on system being arranged in the vehicle after the vehicle is produced by a manufacturer, and at least one internal communication unit arranged for communication with at least one vehicle external communication unit. The method comprises: receiving, using the at least one internal communication unit, configuration information related to at least one sensor of the vehicle from the at least one vehicle external communication unit; and configuring, based on the configuration information, how at least one sensor signal $S_{sensor}$ from the at least one sensor is to be processed by an add-on interface, the add-on interface being arranged in the vehicle as an interface between the at least one vehicle internal system and the at least one add-on system.

13 Claims, 5 Drawing Sheets

(52) U.S. Cl.
CPC .... *H04L 12/40* (2013.01); *H04L 2012/40215* (2013.01); *H04L 2012/40273* (2013.01)

(56) References Cited

U.S. PATENT DOCUMENTS

| | | |
|---|---|---|
| 2005/0068191 A1 | 3/2005 | Eschke et al. |
| 2005/0183098 A1 | 8/2005 | Ilic et al. |
| 2008/0034310 A1 | 2/2008 | Kodosky et al. |
| 2008/0247576 A1 | 10/2008 | Marlowe |
| 2010/0325571 A1 | 12/2010 | Kodosky et al. |
| 2011/0276219 A1 | 11/2011 | Swaminathan et al. |
| 2012/0072055 A1 | 3/2012 | Barlsen et al. |
| 2013/0332844 A1 | 12/2013 | Rutledge |
| 2014/0005856 A1 | 1/2014 | Farnsworth et al. |
| 2017/0259762 A1 | 9/2017 | Zoeller et al. |
| 2017/0264691 A1* | 9/2017 | Bai |

OTHER PUBLICATIONS

Scania CV AB, International Application No. PCT/SE2018/051278, International Search Report, dated Mar. 19, 2019.
Scania CV AB, International Application No. PCT/SE2018/051278, Written Opinion, dated Mar. 19, 2019.
Scania CV AB, Swedish Application No. 1751653-5, Office Action, dated Sep. 4, 2018.
Scania CV AB, European Patent Application No. 18896869.7, Extended European Search Report, dated Aug. 19, 2021.
Scania CV AB, Korean Patent Application No. 10-2020-7020585, Office Action, dated Jul. 28, 2021.

* cited by examiner

METHOD AND CONTROL UNIT FOR CONFIGURING AN ADDON INTERFACE

CROSS-REFERENCE TO RELATED APPLICATIONS

This application is a national stage application (filed under 35 § U.S.C. 371) of PCT/SE2018/051278, filed Dec. 11, 2018 of the same title, which, in turn, claims priority to Swedish Application No 1751653-5 filed Dec. 27, 2017; the contents of each of which are hereby incorporated by reference

FIELD OF THE INVENTION

The present invention relates to a method for configuring an add-on interface of a vehicle. The present invention also relates to a control unit arranged for configuring an add-on interface of a vehicle. The present invention also relates to a computer program and a computer-readable medium comprising instructions for carrying out the method according to the invention.

BACKGROUND OF THE INVENTION

The following background information is a description of the background of the present invention, which thus not necessarily has to be a description of prior art.

Vehicle manufacture may be conducted in a variety of ways. In for example the car industry, the manufacturer usually produces vehicles that are complete and intended for direct delivery to final customers.

The heavy vehicle industry, however, commonly also employs other kinds of production methods. Manufacturers of heavy vehicles may, as in the car industry, produce vehicles intended for delivery directly to final customers or final users of the vehicles. However, it is also common that heavy vehicles produced by the manufacturer are only partly manufactured, i.e. are only completed to a certain extent, including vehicle internal systems, in view of being subsequently completed by another part than the manufacturer, for example a user or a customer of the manufacturer, e.g. a third-party supplier, in such a way as to meet specific requirements of the final customers or users.

It may also be that the vehicle, although substantially completed by its manufacturer, will be provided with further functionalities and/or systems, in this document denoted add-on systems, e.g. by another party such as a third-party supplier, a customer, or a final user, before it is put into use. It is for example usual that commercial vehicle manufacturers, as well as producing fully equipped vehicles, produce also vehicle versions being only partly manufactured, for example intentionally comprising only the chassis, or the chassis and the driver compartment/cab. The partially manufactured vehicle is then intended to be subsequently completed with one or more additional systems and/or functionalities by another party than the manufacturer, in accordance with the specific requirements of the another party, being e.g. a final customer and/or final user.

For example, chassis produced by a vehicle manufacturer may be designed to be usable in any desired way as bases for building on in order to construct mobile homes, fire vehicles, ambulances, concrete mixer trucks, refrigerated vehicles, or any other especially adapted vehicle. Also, for example a bus chassis may be produced by the vehicle manufacturer with little or no bodywork, with the intention to complete the vehicle with subsequent building-on performed by a bus bodybuilder. Generally, a bodybuilder installs/adds one or more add-on systems, i.e. does bodywork, on a vehicle after its original manufacture.

Thus, the building-on and/or addition of one or more systems and/or functionalities carried out by another party may be very extensive, and at least some building-on is also very common in the case of heavy vehicles. For this reason, the vehicle manufacturer often also prepares the vehicle in such a way as to facilitate subsequent building-on.

For example, one or more power takeoffs are often included in the vehicle by the manufacturer, e.g. so that add-on systems may be connected for example to the vehicle's engine and/or gearbox to enable them to be provided with driving power from the vehicle. There may also be connections to make it possible to use, for example, the vehicle's electrical system, hydraulic system and/or pneumatic system for implementation of add-on functions. A vehicle may thus be provided with a plurality of power takeoffs, and the power takeoff requirement may vary depending on the kinds of applications built onto the vehicle. Certain applications may for example require power which is constantly available when the engine of the vehicle is running, irrespective of whether the vehicle is moving or not, e.g. in the case of concrete mixer trucks, refrigeration units in refrigerated vehicles. Other applications may only need power on distinct occasions, e.g. upon activation of an additional system. The activation of a power takeoff for, and hence activation of the operation of, one or more built-on systems and/or functionalities is often not such that continuous or unregulated power takeoff is desirable, since it is only usually required in certain situations, e.g. upon a demand from the built-on systems and/or functionalities themselves or from, for example, the vehicle's driver.

SUMMARY OF THE INVENTION

The one or more add-on systems being implemented in the vehicle are often unknown for the vehicle internal systems, i.e. for the internal systems being provided by the manufacturer, and/or for off-board systems communicating with the vehicle. Therefore, one or more sensors included in the one or more add-on systems may also be unknown for the vehicle internal systems, for the off-board systems, and/or for the add-on interface of the vehicle. A sensor may generally provide an indication, such as a signal, a counter, an impulse or the like, corresponding to a physical occurrence, quantity and/or magnitude of some kind. Generally, the manufacturer cannot, already when the vehicle is produced, know which add-on systems, possibly including sensors, that will be added to the vehicle, and can obviously therefore also not possibly provide a suitable interpretation and/or processing of the signals provided by such add-on sensors.

Thus, it may be impossible to perform actions, functions and/or operations based on the add-on sensor signals, since they cannot even be interpreted by the vehicle internal systems, the off-board systems and/or the add-on interface, since the sensors and their sensor signals may be unknown for the vehicle internal systems, the offboard systems and/or the add-on interface. Hereby, there is a risk that important actions, functions and/or operations are not properly performed in the vehicle and/or in the off-board systems.

It is therefore an object to solve at least some of the above-mentioned disadvantages.

The object is achieved by a method for configuring an add-on interface of a vehicle, the vehicle including:

at least one vehicle internal system;

at least one add-on system, the add-on system being arranged in the vehicle after the vehicle is produced by a manufacturer; and at least one internal communication unit arranged for communication with at least one vehicle external communication unit.

The method includes:

receiving, by usage of the at least one internal communication unit, configuration information related to at least one sensor of the vehicle from the at least one vehicle external communication unit; and configuring, based on the configuration information, how at least one sensor signal $S_{sensor}$ from the at least one sensor is to be processed by an add-on interface, the add-on interface being arranged in the vehicle as an interface between the at least one vehicle internal system and the at least one add-on system.

Thus, the processing/interpretation of the at least one sensor being included in at least one add-on system is defined based on information received from offboard the vehicle. Hereby, the sensor interpretation, and therefore also the processing of the at least one sensor, to be used by the add-on interface may, based on information provided e.g. by a final user and/or a customer, be adapted/configured such that it matches any possible sensor related to any possible add-on system being implemented in the vehicle.

The sensor processing performed by the add-on interface may according to the present invention be adapted/adjusted/configured by the final user and/or a customer, which may have better knowledge of the added add-on systems than the manufacturer has. The adaptation/adjustment/configuration of the add-on interface may be performed by transmitting the configuration information related to the at least one sensor to the vehicle from essentially any entity offboard the vehicle. The sensor related configuration information is transmitted by use of the at least one internal and at least one external communication units.

Since the sensor related processing performed by the add-on interface is hereby easily, reliably and remotely adapted to match the features of the at least one add-on sensor, a flexible add-on interface is provided, which by the final user and/or customer easily may be adapted/adjusted/configured to match the at least one add-on systems, and their sensors, being implemented in the vehicle. The adaptation/adjustment/configuration may completely be controlled by another part than the manufacturer, such as a final user and/or a customer, that normally have better knowledge about some of the add-on systems than the original manufacturer has.

By this adaption/adjustment/configuration of the sensor related processing of the add-on system, any possible sensor signal $S_{sensor}$ provided by any add-on system related sensor may be utilized as any other signal in the vehicle, i.e. may be used as a signal provided by any sensor included in the vehicle internal systems. Thus, a signal from essentially any initially unknown add-on system related sensor may, when the present invention is utilized, be used in the same way as an internal sensor signal $S_{sensor}$ of a vehicle internal system for any purpose and/or by any system in the vehicle.

By way of embodiments of the present invention, the addition of an add-on system to the vehicle is facilitated.

According to an embodiment of the present invention,
the configuration information includes information related to at least one input of an interface control unit including the add-on interface; whereby
the configuring includes indicating at least one input of the interface control unit including the at least one add-on interface to which the at least one sensor is to be connected.

Thus, the input, e.g. an input pin, of the interface control unit to which an add-on system related sensor signal $S_{sensor}$ is to be connected may remotely be defined. Hereby, a flexibility regarding the connection of the sensor to the add-on interface is provided.

According to an embodiment of the present invention,
the configuration information includes information related to at least one first feature of the at least one sensor signal $S_{sensor}$ provided by the at least one sensor, respectively; whereby
the configuring includes defining the at least one sensor signal $S_{sensor}$ to have the at least one first feature, respectively.

Since the at least one add-on system related sensor is probably initially unknown by the vehicle, and thus also by the add-on interface, it is also unknown what the provided sensor signal $S_{sensor}$ looks like. By this embodiment, the features, such as e.g. the physical quantity and/or unit of the signal may be remotely and easily defined such that the sensor signal may be interpreted and processed by the add-on interface.

According to an embodiment of the present invention,
the configuration information includes information related to at least one output of an interface control unit including the add-on interface; whereby
the configuring includes indicating at least one output of the interface control unit including the at least one add-on interface to which at least one processed signal $S_{proc}$ representing at least one sensor signal $S_{sensor}$, respectively, is to be provided.

Thus, the output, which may be an output pin, a connector for a CAN output signal, a wireless output connector, or any other type of output, of the interface control unit, to which a sensor signal $S_{proc}$ processed by the add-on interface is to be provided as an output signal $S_{output}$, may remotely be defined. Hereby, a flexibility regarding providing the add-on interface processed sensor signal S is achieved. The add-on interface processed sensor signal $S_{proc}$ may then be fetched as an output signal $S_{output}$ from this output to be utilized as any other signal in the vehicle, i.e. may be used as a signal provided by any sensor included in the vehicle internal systems. Thus, the add-on interface processed sensor signal $S_{proc}$ may be used in the same way as an internal sensor signal of a vehicle internal system for any purpose and/or by any system in the vehicle, and may be provided to an add-on system and/or to a vehicle internal system According to an embodiment of the present invention,
the configuration information includes information related to at least one second feature of at least one processed signal $S_{proc}$ provided by the add-on interface, respectively; whereby
the configuring includes defining the at least one processed signal $S_{proc}$ to have the at least one second feature, respectively.

Thus, the at least one second feature, e.g. the physical quantity and/or unit of the add-on interface processed signal $S_{proc}$, may remotely be defined. For example, the add-on interface may be configured to provide a voltage defined signal, a current defined signal, a frequency defined signal, or any other type of signal, such as e.g. a modulated signal as a processed signal $S_{proc}$. By this embodiment, the features, e.g. the physical quantity and/or unit, of the processed signal $S_{proc}$ may be remotely and easily defined such that it may be utilized in the same way as an internal sensor signal of a vehicle internal system for any purpose and/or by any system in the vehicle. Thus, a processed signal $S_{proc}$ provided by the add-on interface and having specified features, such as e.g. physical quantity and/or unit, may be provided to essentially any system, such as an internal system or an add-on system, or may be further utilized within the add-on interface, e.g. as a parameter/input to one or more function blocks arranged for performing functions and/or operations on its input signals e.g. to produce a further processed signal $S_{proc}$. Hereby, a flexibility regarding providing the add-on interface processed signal $S_{proc}$ is achieved.

According to an embodiment of the present invention,
the configuration information includes information related to at least one characteristic of the at least one sensor, respectively; whereby
the configuring includes defining at least one characteristic of the at least one sensor, respectively, which is to be utilized when processing/interpreting at least one sensor signal $S_{sensor}$ provided by the at least one sensor, respectively.

Thus, the processing/interpretation of the sensor signal $S_{sensor}$, which should be used by the add-on interface may remotely be defined. Various sensors have various characteristics. For example, a temperature sensor may provide a voltage defined signal which represents a temperature. However, if such a sensor is initially unknown for the add-on interface, and for the vehicle internal systems, it is impossible for the add-on interface and the vehicle internal systems to know that the voltage level provided in the sensor signal $S_{sensor}$ corresponds to a temperature. By this embodiment, the interpretation of the sensor signal $S_{sensor}$, i.e. that the features of the sensor signal $S_{sensor}$, e.g. the voltage level, corresponds to a physical quantity, e.g. a temperature, may be easily and remotely defined and configured.

According to an embodiment of the present invention,
the configuration information related to at least one characteristic includes information related to at least one physical quantity and/or unit conversion; whereby
the configuring includes defining at least one physical quantity and/or unit conversion, which is to be utilized when converting at least one sensor signal $S_{sensor}$ of a first physical quantity and/or unit to at least one processed signal $S_{proc}$ of a second physical quantity and/or unit, respectively.

Thus, a conversion block utilised for the interpretation of the sensor signal $S_{sensor}$, which should be used by the add-on interface, may remotely be defined. Various sensors have various characteristics. For example, a temperature sensor may use a specific conversion characteristic when converting a sensed temperature to a voltage level signal. However, if such a sensor is initially unknown for the add-on interface, and for the vehicle internal systems, it is impossible for the add-on interface and the vehicle internal systems to know which temperature that corresponds to the voltage level provided in the sensor signal $S_{sensor}$. By this embodiment, the conversion of the sensor signal $S_{sensor}$ to be performed by the add-on interface may be easily and remotely defined and configured. A processed signal $S_{proc}$, having a specified second physical quantity and/or unit, may be provided to essentially any system, such as an internal system or an add-on system, or may be further utilized within the add-on interface, e.g. as a parameter/input to one or more function blocks arranged for performing functions and/or operations on its input signals, such that another processed signal $S_{proc}$ is created.

According to an embodiment of the present invention, the configuration information is received from one or more of:
a final user of the vehicle;
at least one other part than the manufacturer, the at least one other part having knowledge of the at least one add-on system; and
the manufacturer.

Thus, the add-on interface may be flexibly updated/configured based on configuration information provided by a number of sources. Essentially anyone with knowledge of the add-on systems and their related sensors may be able to update the add-on interface. This makes it easier and more flexible e.g. for customers to include add-on systems in the vehicle, since the manufacturer does not need to get involved when including the add-on systems, e.g. does not have to configure and/or develop the add-on interface for individual customer needs.

The object is also achieved by the above-mentioned control unit arranged for for configuring an add-on interface of a vehicle, the vehicle including:
at least one vehicle internal system;
at least one add-on system, the add-on system being arranged in the vehicle after the vehicle is produced by a manufacturer; and
at least one internal communication unit arranged for communication with at least one vehicle external communication unit.

The control unit is arranged for:
receiving, by usage of the at least one internal communication unit, configuration information related to at least one sensor of the vehicle from the at least one vehicle external communication unit;
configuring, based on the configuration information, how at least one sensor signal $S_{sensor}$ from the at least one sensor is to be processed by an add-on interface, the add-on interface being arranged in the vehicle as an interface between the at least one vehicle internal system and the at least one add-on system.

The control unit has advantages corresponding to the ones mentioned above for the method.

The object is also achieved by the above-mentioned computer program and computer-readable medium.

Detailed exemplary embodiments and advantages of the method, control system, computer program and computer-readable medium according to the invention will below be described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which.

DETAILED DESCRIPTION OF THE INVENTION

Figure 1:
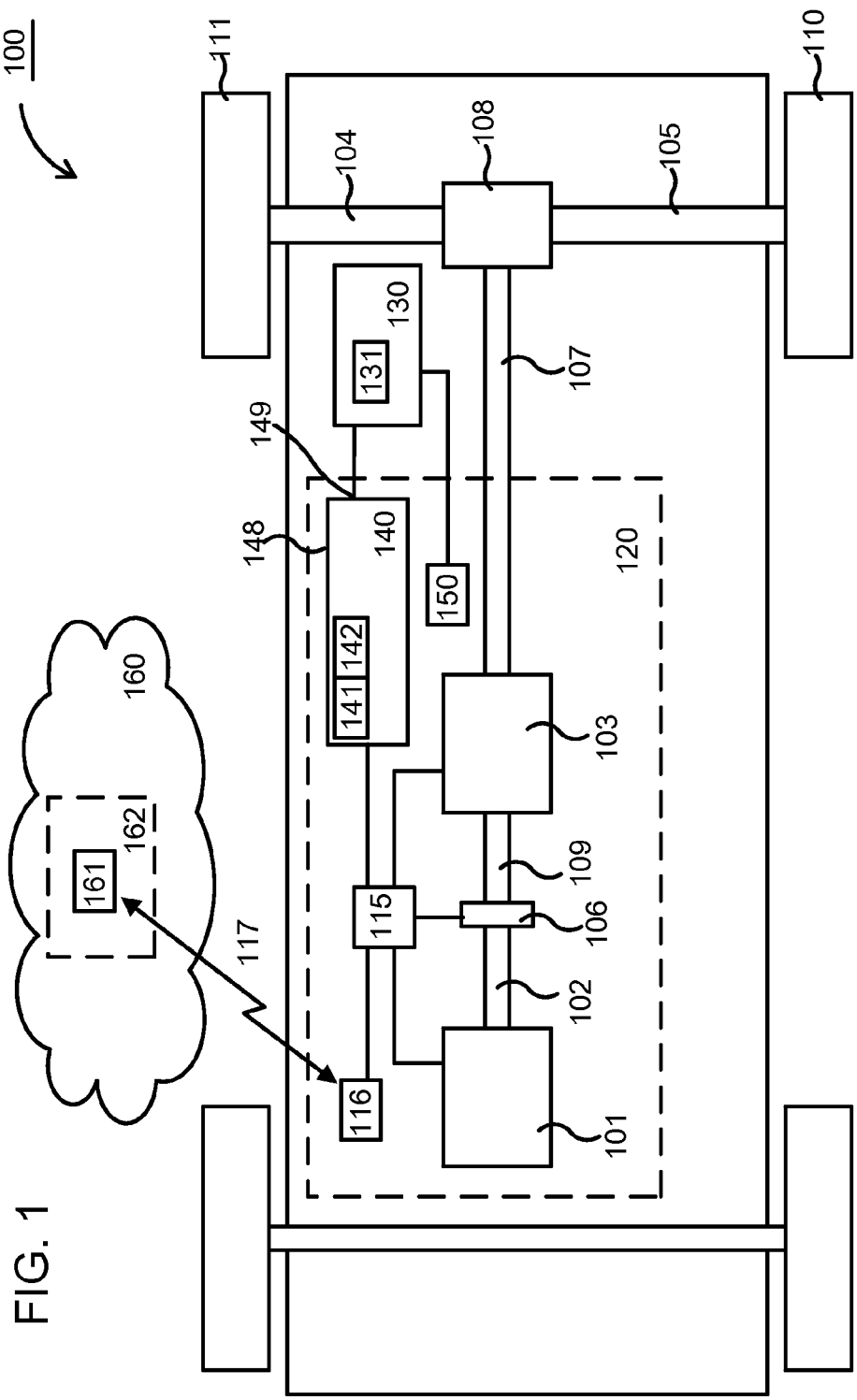
FIG. 1 is a schematic illustration of a non-limiting example of a vehicle in which the embodiments of the present invention may be implemented.

FIG. 1 schematically illustrates a power train in a vehicle 100, in which the embodiments of the present invention may be implemented. The illustrated vehicle 100 has only one axle 104, 105 with tractive/drive wheels 110, 111, but the invention is also applicable to vehicles which have more than one axle provided with tractive wheels. The power train comprises a combustion engine 101 which in a conventional way, via an output shaft 102 of the engine, usually via a flywheel, is connected to a gearbox 103 via a clutch 106 and an input shaft 109 connected to the gearbox 103.

The engine may be controlled by the vehicle's control system via a control unit 115. The clutch 106, which may for example take the form of an automatically controlled clutch, and/or the gearbox 103, which may for example be a conventional automatic gearbox, may also be controlled by means of one or more suitable control units, generally depicted as the control unit 115 in FIG. 1. Thus, the function of the control unit 115 may be provided by two or more control units, as is mentioned more in detail below.

The vehicle 100 may further include at least one internal communication unit 116, being associated/connected to one or more control units 115 of the vehicle. For example, the at least one internal communication unit 116 may be included in a control system network of the vehicle 100. The control system network may, as is described below, essentially include any suitable communication interface facilitating communication between control units/devices/entities in the vehicle 100. For example, the communication interface connects the one or more vehicle internal systems 120 with each other, including connecting the at least one internal communication unit 116 with the control unit 115 and other internal systems 120 of the vehicle 100. Such a communication interface many for example, include a controller area network (CAN), an Ethernet connection, a Flexray bus, a local interconnect network (LIN) bus and/or a WiFi connection.

The at least one internal communication unit 116 is arranged for communication with at least one vehicle external communication unit 161, i.e. arranged for transmitting information to and/or receiving information from the at least one vehicle external communication unit 161. The at least one vehicle external communication unit 161 is arranged outside of the vehicle 100, and may be included in and/or associated/connected to essentially any suitable external device/node/apparatus/entity 162, such as e.g. at least one web and/or internet related unit, at least one internet cloud 160 related unit, at least one infrastructure unit, at least one external communication entity included in at least one other vehicle, at least one server and/or at least one database. The at least one vehicle external communication unit 161 may also be included in and/or associated/connected to essentially one or more of the units/devices/entities 411, 412, 413, 414, 420, 430, 440 of an add-on/bodybuilder network 410, as is described more in detail below.

The communication between the at least one internal 116 and at least one external 161 communication units may be performed by usage of a wireless connection 117, e.g. a connection working according to essentially any suitable wireless standard, specification and/or protocol, such as according to the Global System for Mobile communications (GSM) standard, the General Packet Radio Service (GPRS) standard, the Bluetooth standard, any suitable wireless local area networking (WiFi) standard, any suitable generation of a broadband cellular technology (3G, LTE, 4G, 5G) standard, and/or any other suitable wireless standard. Alternatively, the connection 117 may also be a wired connection, including usage of at least one cable or other wiring equipment.

As illustrated in FIG. 1, an output shaft 107 from the gearbox 103 drives the tractive wheels 110, 111 via a final gear 108, e.g. a conventional differential, and driveshafts 104, 105 which are connected to the final gear.

The engine 101, the clutch 106 and the gearbox 103 may be examples of vehicle internal systems 120. As is understood by a skilled person, the vehicle may include a large number of such vehicle internal systems 120, i.e. systems arranged in the vehicle 100 when it was produced by the manufacturer.

In this document, parts, systems and/or functionalities being included/arranged in the vehicle already at vehicle manufacture/production by the manufacturer is commonly denoted vehicle internal system 120. Correspondingly, parts, systems and/or functionalities being included/arranged in the vehicle after the manufacture/production by the manufacturer is commonly denoted add-on systems 130 in this document. The manufacturer is in this document defined as a producer of the original/initial vehicle, being partly completed with at least one vehicle internal system 120 but lacking the later added at least one add-on system 130. The manufacturer of the partly completed vehicle may also be denoted as original equipment manufacturer (OEM). The one or more add-on systems 130 may be provided by another party, which in this document means a party which may be another and/or independent of the vehicle manufacturer, and to which a vehicle produced by the vehicle manufacturer is directly or indirectly delivered after being manufactured/produced. Thus, the other party may be a customer or a final user, but may also be a third-party supplier, which carries out building-on, i.e. addition of one or more add-on systems 130, before delivery to a final customer.

It should be noted that the vehicle depicted in FIG. 1 is merely one example of how the vehicle might be configured, as the embodiments of the invention are applicable to all types of vehicles, e.g. those with hybrid power trains, electric vehicles and/or other kinds of axle configurations, other types of gearboxes with or without clutches etc.

The one or more add-on systems 130 illustrated in FIG. 1 may be provided with power from one or more takeoffs 150, which may be situated at various locations in the vehicle 100.

The one or more add-on systems 130 may be of various kinds, e.g. one might comprise activation of a crane function via a power takeoff, whereas another might comprise illumination of a certain warning lamp at the vehicle driver's location. Thus, the one or more add-on systems 130 may be of a simple kind, i.e. have a low complexity, but may also have substantially any desired functionality, and thus also any complexity.

The one or more add-on systems 130 may need, i.e. may have a demand for, power to be provided to the add-on systems 130. The one or more add-on systems 130 may also need, i.e. may have a demand for, being able to communicate with an internal control system of the vehicle, in order to be provided with one or more signals, parameters and/or control signals available in the internal control system, and/or to be able to provide one or more signals, parameters and/or control signals to the one or more vehicle internal systems 120 via the vehicle internal control system. The one or more add-on systems 130 may also need, i.e. may have a demand for, being able to communicate with one or more nodes/devices/entities/equipment external from the vehicle.

Power needed by the one or more add-on systems 130 may e.g. be provided by the above mentioned one or more power takeoffs 150 and/or may be provided by an add-on interface 140 arranged for providing communication between the one or more vehicle internal systems 120 and the one or more add-on systems 130. The communication between the one or more vehicle internal systems 120 and the one or more add-on systems 130 is facilitated by the add-on interface 140. Thus, the add-on interface communicates one or more signals, parameters and/or control signals between the one or more vehicle internal systems 120 and the one or more add-on systems 130. Thus, the add-on interface 140 is provided as a general interface between the at least one vehicle internal system 120 and the at least one add-on system 130. The add-on interface includes one or more inputs/outputs, for example input/output pins, to which systems, such as e.g. add-on systems, may be connected. Via these inputs/outputs, signals are received/transmitted to the systems connected to the add-on interface 140. For example, the one or more add-on systems may be connected to one or more inputs of the add-on interface, and may provide signals of any suitable signaling format, which is often related to the specific add-on system providing the signal, to the one or more inputs. Essentially, any signaling format mentioned in this document may be received at the one or more inputs. Correspondingly, signals may also be output on the one or more outputs of the add-on interface 140, on a suitable signaling format, such as any signaling format mentioned in this document.

As mentioned above, the at least one internal communication unit 116, and also the vehicle internal systems 120, may be included in a control system network of the vehicle 100, which may include the above-mentioned communication interface connecting the one or more vehicle internal systems 120 with each other. Such a communication interface may for example, include a controller area network (CAN), an Ethernet connection, a Flexray bus, a local interconnect network (LIN) bus and/or a WiFi connection. Such a communication interface may be generally used for connecting units/devices/entities/interfaces in the vehicle 100, such as connecting the add-on systems 130 to the add-on interface 140. The at least one add-on system 130 may be connected to an external control system network input, e.g. an external controller area network (CAN) input 149, of an interface/control unit 148 including the add-on interface 140. Hereby, a connection between the one or more add-on systems 130 and the communication interface, such as e.g. the controller area network (CAN), is provided, which is used for connecting the one or more add-on systems 130 to the one or more vehicle internal systems 120, via the communication interface, e.g. via the controller area network (CAN).

Thus, the one or more add-on systems 130 may need various information to be provided to them, from within the vehicle and/or from outside of the vehicle, and may therefore have a demand for communication abilities. The one or more add-on systems 130 may also demand resources from the vehicle, such as e.g. status signals from the vehicle, i.e. the signal state of appropriate outputs of the interface/control unit 148 including/implementing the add-on interface 140. The resources which the one or more add-on systems demand for their functions may for example take the form of a demand for mechanical power, electric power, hydraulic power and/or pneumatic power, and/or may take the form of a demand for at least one signal and/or at least one function of the control system of the vehicle. Normally, a demanded power, requiring activation of a power takeoff 150 has to be demanded from the internal control system of the vehicle 100. Where resources are demanded, they are often not constantly demanded, and are also often not constantly available.

Vehicle manufacturers are reluctant for some other party, e.g. a third-party supplier, to effect changes directly in the internal control system of the vehicle, since this may affect the performance of the vehicle in ways which are both undesirable and difficult to predict. This is also why the vehicle manufacturer provides the add-on interface 140, i.e. a signaling interface which can be used for an add-on system for communication with the internal control system of the vehicle.

The add-on interface 140 may be of various kinds, and may include a number of inputs and outputs, which each may have a certain function assigned to it. One output might for example represent activation of a vehicle internal system 120, e.g. a parking brake activation, and when the parking brake is applied this output might for example be set to a high level, in order to thereby communicate the activation of the internal system, e.g. the parking brake, to the one or more add-on systems 130. As is understood by a skilled person, a large number of other examples of functions, whose status may be signaled in a similar way, may be provided by the add-on interface 140. These signals may then be used by the one or more add-on systems 130, but subject for example to various conditions, which usually have to be fulfilled for a certain function to be activated.

Thus, by the add-on interface 140, the vehicle manufacturer may provide a building-on interface to enable communication between the internal systems 120 and the add-on system 130. The add-on interface 140 may for example comprise one or more terminal blocks having a number of inputs/outputs, such that high/low/numerical signals on an output may for example represent a status of a certain function, and this information may be used as a control signal for conditional control of add-on system functions. There may also be inputs, e.g. for conveying from the add-on systems 130 signaling, e.g. such that inputting a high signal level on a certain input indicates a demand for activation of a function having a defined meaning.

As a given chassis configuration may be used for add-on systems within a large number of areas of application, it is often not possible at vehicle manufacturing stage to know the specific intended use of a specific chassis, still less the characteristics of specific add-on systems 130. Thus, the add-on systems may communicate their status, e.g. whether the function is active or inactive, by applying e.g. a voltage to an input on the add-on interface 140, which will be communicated further to the internal control system and/or vehicle internal systems 120 by the add-on interface 140. The internal communication system and/or the vehicle internal systems 120 will thus also be aware that add-on systems 130 exist and their status.

Control systems in modern vehicles usually comprise a communication bus system comprising of one or more communication buses arranged for connecting together a number of electronic control units (ECUs), e.g. the control units, or controllers, and various systems/components/devices on board the vehicle. Such a control system may comprise a large number of control units and the responsibility for a specific function may be spread over more than one of them.

For sake of simplicity, FIG. 1 shows only some such control units 115, 140. However, parts of the present invention may be implemented in any suitable control unit, e.g. the control units 115, 140, or wholly or partly in one or more other control units on board the vehicle 100. Control units of the kind depicted are normally adapted to receiving sensor signals from various parts and/or control units of the vehicle. Control units are also usually adapted for delivering control signals to various parts and components of the vehicle, e.g. the control units 115, 140 may deliver signals to suitable actuators for activation of power takeoffs and/or for activation of other vehicle internal systems 120.

The control unit 115 is in FIG. 1 schematically illustrated as receiving signals and/or providing control signals from and/or to the engine 101, the clutch 106 and/or the gearbox 103. The control unit 115 may, also receive and/or provide control signals to and/or from other internal systems/devices 120 in the vehicle 100.

According to some embodiments of the present invention, as described in this document, the interface control unit 148 including the add-on interface 140 may comprise reception means 141 arranged for receiving configuration information, e.g. a reception unit 141, and configuration means 142 arranged for configuring the add-on interface, e.g. a configuration unit 142. These control means/units/devices 141, 142 are described more in detail below, and may be divided physically into more entities than the herein described interface control unit 148, or may be arranged in less entities than herein described.

Figure 2:
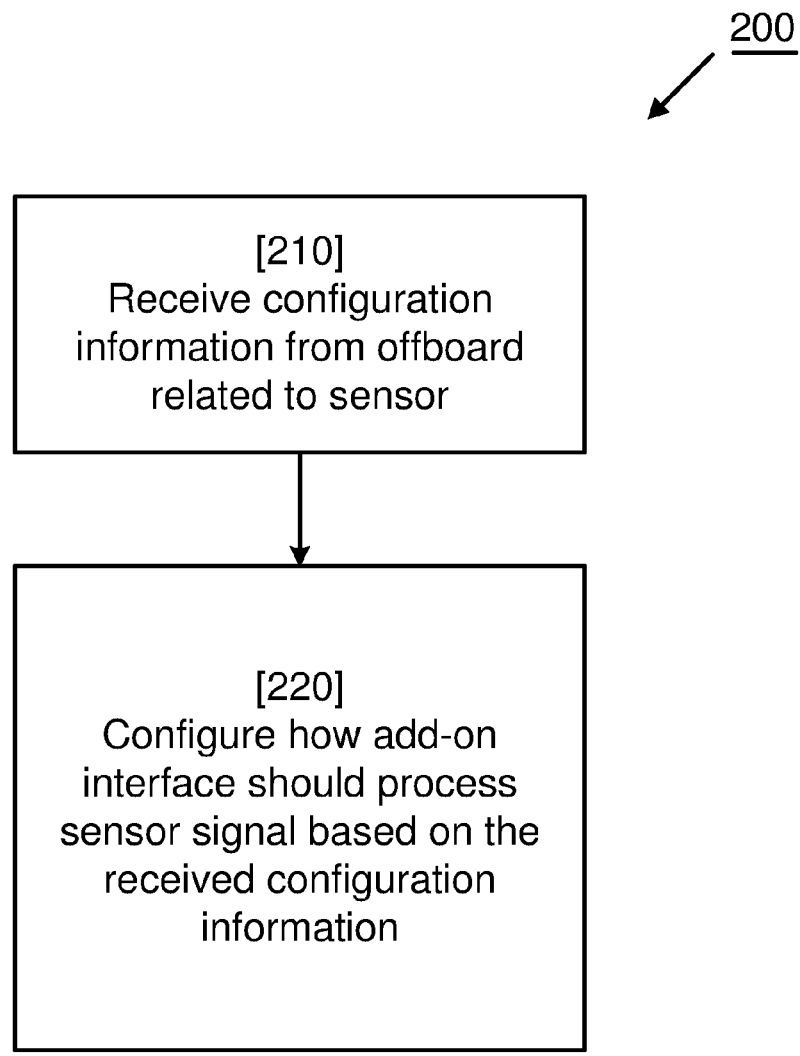
FIG. 2 shows a flow chart diagram for some embodiments of the present invention, FIG. 3 schematically illustrates an interface control unit, FIG. 4 schematically illustrates a non-limiting example of a system, in which embodiments of the present invention may be implemented.

FIG. 2 shows a flow chart diagram for a method 200 according to an embodiment of the present invention, i.e. a method for configuring an add-on interface of a vehicle. The method steps of FIG. 2 may be performed in another order than illustrated in FIG. 2, as long as the information needed for performing a method step is available when the step is to be performed.

In a first step 210 of the method according to the present invention, configuration information related to at least one sensor 131 of the vehicle 100 is received from the at least one vehicle external communication unit 161 by usage of the at least one internal communication unit 116. The first step may be performed e.g. by use of a below described reception unit/means 141.

In a second step 220 of the method according to the present invention, it is configured, i.e. the add-on interface is configured, how at least one sensor signal $S_{sensor}$ from the at least one sensor 131 is to be processed by the add-on interface 140. The configuration is based on the received configuration information. As mentioned above, the add-on interface 140 is arranged in the vehicle 100 as an interface between the at least one vehicle internal system 120 and the at least one add-on system 130. The second step 220 may be performed e.g. by use of a below described configuration unit/means 142.

According to embodiments of the present invention, the at least one sensor may comprise one or more from the group: a temperature sensor, a pressure sensor, a position sensitive sensor, a tilt sensor, an accelerometer, a voltage sensor and a current sensor. Other sensors are also possible.

By usage of the present invention, the interpretation of the at least one sensor, and therefore also the processing of the at least one sensor, to be used by the add-on interface may, based on information provided remotely from an offboard entity, e.g. provided by a final user and/or a customer, be adapted/configured such that it matches any possible sensor related to any possible add-on system being implemented in the vehicle.

Hereby, essentially any possible sensor signal $S_{sensor}$ provided by any add-on system related sensor may be utilized as any other signal in the vehicle, i.e. may be used as a signal provided by any sensor included in the vehicle internal systems. Thus, a signal from essentially any initially unknown add-on system related sensor may, when the present invention is utilized, be used e.g. for being displayed in an instrument, for being used as an input signal in any vehicle internal system and/or in any add-on system. The add-on sensor signal $S_{sensor}$ being interpreted/processed in the add-on interface may thus be used as any other ordinary information signal and/or control signal in the vehicle, without the systems receiving this signal having to know its origin. Thus, the vehicle internal systems and/or add-on systems to which the signal is provided do not have to treat this signal differently than any other signal in the vehicle, since the interpretation/processing of the signal has been taken care of in the add-on interface.

Generally, the confirmation information related to the processing of the at least one sensor signal $S_{sensor}$ may be received from, i.e. may be provided/inputted by, essentially anyone, e.g. by usage of an add-on interface configuration tool 414. For example, the sensor related information, may be provided by a final user of the vehicle 100, or by at least one other part than the manufacturer, such as e.g. a customer, wherein the at least one other part has knowledge of, e.g. has provided, manufactured, installed and/or adapted, the at least one add-on system 130. Of course, the sensor related information may also be provided by the manufacturer of the vehicle. Hereby, a very flexible add-on interface is provided, and a flexible usage of sensors in add-on systems is provided.

According to embodiments of the present invention, the at least one sensor 131 may be at least one sensor of the at least one add-on system 130. Alternatively, the at least one sensor may be at least one sensor of the at least one vehicle internal system.

According to an embodiment of the present invention, the input, e.g. an input pin 149, of the interface control unit 148 to which an add-on system related sensor signal $S_{sensor}$ is to be connected is remotely defined by including information related to at least one input 149 of the interface control unit 148 comprising the add-on interface 140 in the configuration information being sent to the vehicle via the at least one external communication unit 161 and the at least one internal communication unit 116. This information related to at least one input 149 is then used for configuring the add-on interface, such that at least one input 149 of the interface control unit 148 is indicated to which the at least one sensor 131 is to be connected. In other words, the add-on control interface may be configured to receive a sensor signal $S_{sensor}$ on any suitable input 149 of the interface control unit 148.

According to an embodiment of the present invention, at least one first feature of the sensor signal $S_{sensor}$ is defined in the add-on interface. Information related to such at least one first feature, e.g. at least one first physical quantity and/or unit of the at least one sensor signal $S_{sensor}$ provided by the at least one sensor 131, respectively, is included in the configuration information being received by the add-on interface 140 via the at least one external communication unit 161 and the at least one internal communication unit 116. Based on this information related to at least one first feature of at least one sensor signal $S_{sensor}$, the add-on interface is configured 220 using the definition that the at least one input sensor signal $S_{sensor}$ has that at least one first feature, respectively. Hereby, the input sensor signal $S_{sensor}$ may be correctly detected/interpreted/processed by the add-on interface 140, irrespective of its features, such as e.g. its physical quantity and/or unit. For example, the add-on interface may hereby be remotely configured to know if the sensor signal $S_{sensor}$ is a voltage defined signal, a current defined signal, or any other type of signal, such as e.g. a modulated signal, such that the add-on interface may interpret and process the signal.

According to an embodiment of the present invention, the output of the interface control unit, to which a sensor signal $S_{proc}$ processed by the add-on interface signal is to be provided, may remotely be defined. This is achieved by including information related to at least one output 147 of the interface control unit 148 including the add-on interface 140 in the configuration information. Then, this received information related to the at least one output 147 is used for configuring the add-on interface 140, such that at least one output 147 of the interface control unit 148 is indicated, to which at least one processed signal $S_{proc}$ representing at least one sensor signal $S_{sensor}$, respectively, is to be outputted as an output signal $S_{output}$. The add-on interface processed sensor signals $S_{proc}$ may then be fetched from this defined/configured output to be utilized as any other signal in the vehicle, i.e. may be used as a signal provided by any sensor included in the vehicle internal systems. The output 147 may include an electrical connector, to which an electrical signal is provided, may include a bus connector, to which a suitable bus signal, e.g. a CAN bus signal, is provided, may include a wireless connector/antenna to which a radio signal, such as a Wifi or Bluetooth signal, is provided, or may provide any other suitable kind of connector.

According to an embodiment of the present invention, the add-on interface 140 is configured to provide at least one interpreted/processed signal $S_{proc}$ having at least one specific second feature, such as e.g. a physical quantity and/or unit. This is achieved by including information related to at least one second feature of the at least one processed signal $S_{proc}$ provided to at least one output 147 and/or to at least one function block of the interface control unit 148 in the configuration information received by the add-on interface via the at least one external communication unit and the at least one internal communication unit. The add-on interface 140 is configured based on this information related to the at least one second feature, such that the at least one processed signal $S_{proc}$, i.e. the at least one sensor signal having been interpreted/processed by the add-on interface 140, is defined to have the at least one second feature, which may differ from the at least one first feature of the at least one sensor signal $S_{sensor}$, respectively. Thus, the at least one second feature of the add-on interface processed signal $S_{proc}$, may remotely be defined to provide e.g. a voltage defined signal, a current defined signal, a frequency defined signal, or any other type of signal, such as e.g. a modulated signal, or a bus signal used e.g. for a CAN bus. Hereby, the processed signal $S_{proc}$ may be given features which are commonly interpretable by other systems in the vehicle, i.e. internal and add-on systems, and by any off-board systems. As mentioned above, a processed signal $S_{proc}$, having a specified second feature, may be provided to, and used by essentially any system, such as an internal system or an add-on system, or may be further utilized within the add-on interface itself, e.g. as a parameter/input to one or more function blocks arranged for performing functions and/or operations on its input signals.

According to an embodiment of the present invention, the interpretation of the sensor signal $S_{sensor}$, which should be used by the add-on interface may be remotely defined. This is achieved by including information related to at least one characteristic of the at least one sensor 131, respectively, in the configuration information received by the add-on interface 140 via the at least one internal communication unit 116 and the at least one external communication unit 161. Then, the add-on interface 140 is configured based on the information related to the at least one characteristic of the at least one sensor 131, such that a definition of the at least one characteristic of the at least one sensor 131 is included in the configuration. This definition is then utilized by the add-on interface when processing/interpreting at least one sensor signal $S_{sensor}$ provided by the at least one sensor 131, respectively.

Since various sensors have various characteristics, the characteristics of the used sensors has to be known/defined by the add-on interface for each sensor. For example, a temperature sensor may provide a voltage defined signal which represents a temperature, whereby the add-on interface should be configured to interpret the received voltage defined sensor signal $S_{sensor}$ as a temperature indication. Correspondingly, if a temperature sensor instead provides a current defined signal to represent a temperature, the add-on interface should be configured to interpret the received current defined signal as a temperature indication. The sensor signal $S_{sensor}$ could also have other forms/features, having electrical signal features, e.g. frequency modulation related features and/or pulse related features.

According to an embodiment of the present invention, a physical quantity and/or unit conversion to be utilised by the add-on interface for the interpretation of the sensor signal $S_{sensor}$ may be remotely defined. To achieve this, information related to at least one physical quantity and/or unit conversion for the sensor is included in the configuration information, which is received by the add-on interface 140 via the at least one external communication unit 161 and the at least one internal communication unit 116. The information related to at least one physical quantity and/or unit conversion for the sensor is then used when configuring 220 of the add-on interface 140 is performed. The configuration then includes defining at least one physical quantity and/or unit conversion, which is to be utilized when converting at least one sensor signal $S_{sensor}$ of a first physical quantity and/or unit to at least one processed signal $S_{proc}$ of a second physical quantity and/or unit, respectively. One non-limiting example of a quantity conversion is a conversion from a voltage to a temperature, or vice versa, which also results in a unit conversion e.g. from Volt (V) to degrees centigrade (° C.), or vice versa. One other non-limiting example of a unit conversion may be a conversion between different units of the same quantity, e.g. from Volt (V) to milli-Volt (mV). The processed signal may be provided to an internal system and/or an add-on system, or may be further utilized/processed within the add-on interface, e.g. as a parameter/input to one or more function blocks of the add-on interface arranged for performing functions and/or operations on its inputs/parameters, thereby creating another processed signal $S_{proc}$.

As mentioned above, various sensors have various characteristics, that have to be known/defined by the add-on interface for each sensor. For example, a temperature sensor may use a specific conversion characteristic when converting a sensed temperature to a voltage level defined signal. By usage of this embodiment, the conversion characteristic of the sensor signal $S_{sensor}$ to be used by the add-on interface for the conversion may be easily and remotely defined and configured.

Figure 3:
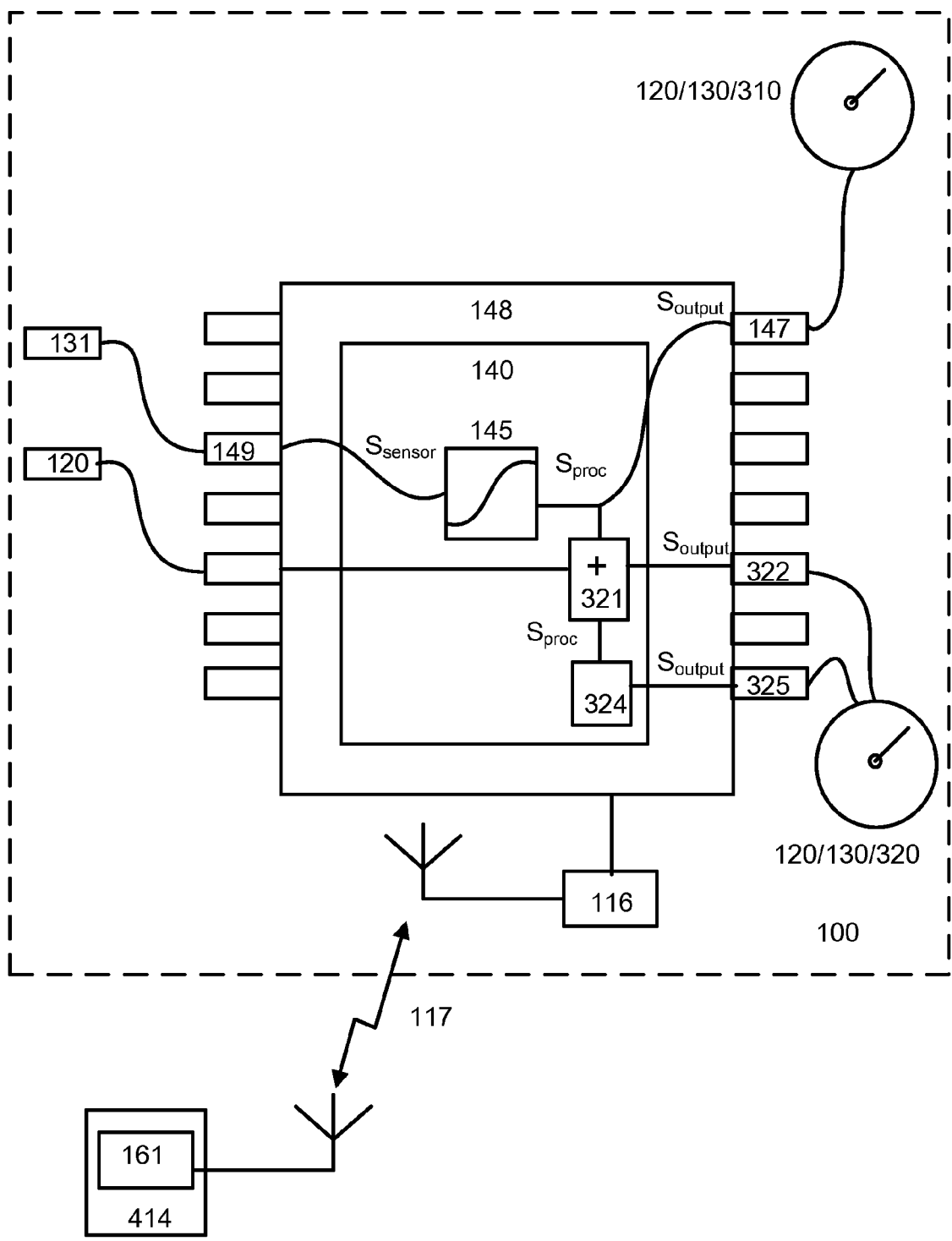

FIG. 3 schematically illustrates a non-limiting example of an embodiment of the present invention. An interface control unit 148 implementing/including the add-on interface 140. In FIG. 3, a non-limiting example of a function block 145 including a sensor characteristic for a sensor 131 related to, e.g. being included in, an add-on system. The sensor characteristic is used by the function block 145 to interpret the sensor signal $S_{sensor}$ provided to an input 149 of the interface control unit 148, e.g. an external input pin, 149, where a first feature of the sensor signal $S_{sensor}$ is detected, e.g. a voltage is measured. The add-on interface 140 is configured such that a definition of the at least one characteristic of the at least one sensor 131 is included in the configuration, e.g. implemented in a function block 145. This definition is then utilized by the add-on interface when interpreting at least one sensor signal $S_{sensor}$ provided by the at least one sensor 131.

The by the add-on interface 140 interpreted/processed signal $S_{proc}$ may then be provided as an output signal $S_{output}$ to a specified output 147, e.g. an external output pin, of the interface control unit 148. The output signal $S_{output}$ may here have essentially any suitable features, such as e.g. features related to voltage, current, frequency and/or phase, and/or may be related to shifts of features and/or to electromagnetic properties of the signal. The output signal $S_{output}$ may be a bus signal, such as a CAN bus signal, or may be a wireless signal. The output signal $S_{output}$ may be provided to an output 147 of a suitable kind, such as e.g. an external output pin, possibly an external CAN pin, and may be used as any other signal in the vehicle, e.g. may be displayed by an instrument 310, in any add-on 130 and/or vehicle internal systems 120.

As illustrated in FIG. 3, the processed signal $S_{proc}$ may, instead of, or in addition to, being output as an output signal $S_{output}$ having the above-mentioned features, also be utilized within the add-on interface 140 itself, e.g. as an input signal/parameter to essentially any function block 321 of the add-on interface, in which a further output signal $S_{output}$ and/or a further processed signal $S_{proc}$ may be produced. The further processed signal $S_{proc}$ may then have features suitable for being further utilized within the add-on interface itself as an input signal/parameter to any further function block 324 of the add-on interface 140, and so on. As a non-limiting example, the processed signal $S_{proc}$ may in block 321 be combined, e.g. as a summation, with a signal provided by essentially any system, e.g. a vehicle internal system 120, thereby creating another output signal $S_{output}$ provided to an output 322 for example to be displayed in an instrument 320. Also, as a non-limiting example, the further processed signal $S_{proc}$ provided by the function block 321 may be further processed in the further function block 324, thereby creating yet another output signal $S_{output}$ provided to an output 325 for example to be displayed in the instrument 320. Thus, the processed signal $S_{proc}$, being the interpreted/processed sensor signal, may be directly provided as an output signal $S_{output}$ to an output 147 of the interface control unit 148 and/or may be further used in the add-on interface, e.g. in one or more suitable function blocks 321, 324 before being provided to suitable outputs 322, 325 of the interface control unit 148.

Also, the add-on interface 140 may be defined, by implementation of the function block 145, to know that the sensor signal $S_{sensor}$ from the add-on sensor 131 has at least one first feature, e.g. a specified first physical quantity and/or unit, and to know that the processed signal $S_{proc}$ and/or the add-on interface output signal $S_{output}$ should have at least one second feature, e.g. a certain second physical quantity and/or unit, on which format the processed signal $S_{proc}$ and/or the output signal $S_{output}$ should be provided to the further function block(s) 321, 324 and/or to the output 147.

All of these parameters, i.e. the configuration of the add-on interface 140, may be based on configuration information provided remotely from an offboard entity, e.g. provided by a final user and/or a customer, be adapted/configured such that it matches any possible sensor related to any possible add-on system being implemented in the vehicle.

As a non-limiting example, an add-on sensor 131 may be a temperature sensor, which provides a voltage defined sensor signal $S_{sensor}$ to the input 149, where the various voltage levels of the sensor signal $S_{sensor}$ correspond to various temperatures measured/sensed by the sensor 131. The add-on interface 140 is then configured such that it has knowledge of the at least one first feature of the sensor signal $S_{sensor}$, e.g. that the physical quantity of the sensor signal $S_{sensor}$ is voltage and the unit is milli-Volt (mV). The add-on interface 140 is also configured such that it has knowledge of at least one characteristic of the at least one sensor 131, such that it, e.g. in the function block 145, is able to convert a specific voltage level of the sensor signal $S_{sensor}$ to a corresponding temperature quantity value of the unit centigrade degrees (° C.). For example, the function in the function block 145 may then be Y=X*0.25−273, for an input signal X. The add-on interface 140 is further configured such that it knows which at least one second feature, i.e. which physical quantity and/or unit the processed signal $S_{proc}$ should have, i.e. the quantity temperature and the unit centigrade degrees (° C.) for the above example. Thus, for the given example, a temperature value in degrees centigrade (° C.) may be output as an output signal $S_{output}$ on the output, e.g. to a CAN bus, as mentioned above. Other examples of the at least one second feature may be the unit Volt (V) for a voltage defined processed signal $S_{proc}$, the unit Ampere (A) for a current defined processed signal $S_{proc}$, or the unit Herz (Hz) for a frequency defined processed signal $S_{proc}$.

The processed signal $S_{proc}$ may then be provided to an output 147, and is useful for any system having a temperature as an input parameter, e.g. a temperature indicating instrument 310. The processed signal $S_{proc}$ may also be provided to one or more further function blocks 321, 324 of the add-on interface, and may there provide one or more further output signals $S_{proc}$ 322, 325, as mentioned above.

As further examples may be mentioned that one or more of the at least one first feature and the at least one second feature may be related to a measurement accuracy, e.g. for a sensor, and/or to a signal resolution, e.g. for one or more of the signals being used/processed.

The configuration of the add-on interface 140, may be based on configuration information provided remotely from an offboard entity 414, such as an add-on interface configuration tool, e.g. provided by a final user and/or a customer, such that it matches any possible sensor related to any possible add-on system being implemented in the vehicle. As mentioned above, the configuration may be provided to the add-on interface via at least one external communication unit 161 and at least one internal communication unit 116.

Figure 4:
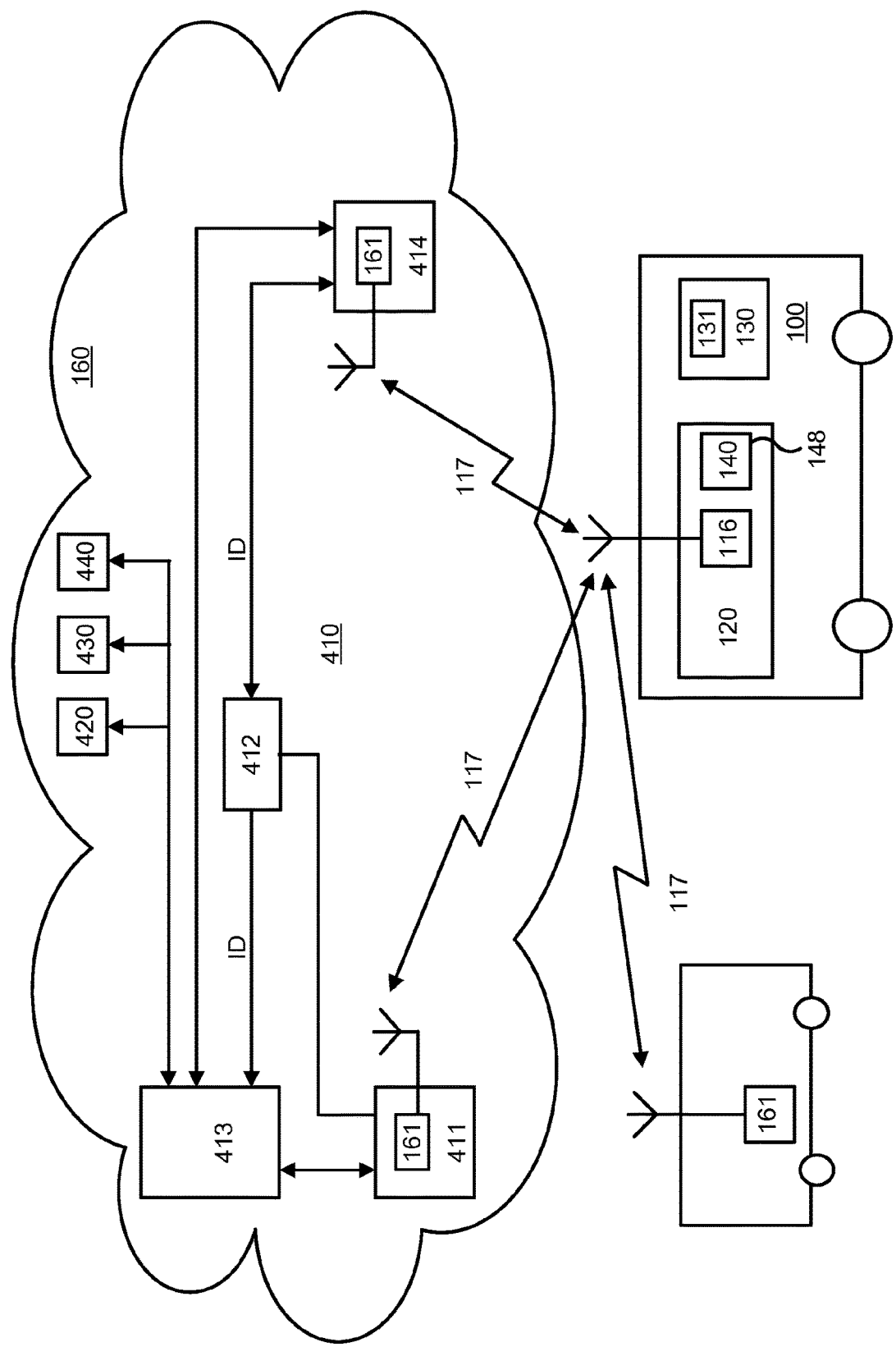

FIG. 4 schematically illustrates a system facilitating a general platform for handling vehicles including one or more add-on systems 130. As is understood by a skilled person, FIG. 4 for pedagogical reasons only shows some of the units/devices/entities/nodes in such a system. Essentially, only the units/devices/entities/nodes useful for explaining the concept are schematically illustrated in FIG. 4.

A vehicle 100, as the one described in this document, includes one or more vehicle internal systems 120, including at least one internal communication unit 116 and an interface/control unit 148 including an add-on interface 140. The vehicle 100 further includes one or more add-on systems 130, connected to the one or more vehicle internal systems 120 via the add-on interface 140, as described above. The at least one internal communication unit 116 may communicate with at least one external communication unit 161, which may be located essentially anywhere outside of the vehicle, e.g. in another vehicle and/or in one or more nodes 411, 412, 413, 414, 420, 430, 440 of an add-on/bodybuilder network 410. The one or more nodes 411, 412, 413, 414, 420, 430, 440 of the add-on/bodybuilder network 410 may be located e.g. in a web/internet/cloud related unit, in an infrastructure unit, in a server and/or in a database, as mentioned above. Generally, the add-on/bodybuilder network 410 may be implemented as an internet cloud 160 related solution. Generally, the one or more nodes 411, 412, 413, 414, 420, 430, 440 of an add-on/bodybuilder network 410 are in FIG. 4 for pedagogic reasons illustrated as separate nodes. However, these nodes may be implemented less nodes than illustrated in FIG. 4.

The add-on interface 140 utilized for the embodiments of the present invention may be an advanced and flexible interface provided with advanced logical functionality and possibilities for flexible definition of interface inputs and/or outputs. According to an embodiment, the logical functionality providable by the add-on interface 140 includes essentially any useful logical, numerical and/or mathematical operations, that may be operated on one or more signals input to the add-on interface 140. The input signals may here, according to various embodiments, include essentially any kind of signal, such as digital and/or analog signals, comprising well defined signal value levels and/or numerical signal values. Thus, the add-on interface 140 used by the embodiments of the present invention may be considerably more advanced than conventional add-on interfaces are, including e.g. processing of numerical signals, representation of physical values as numerical values, and/or performing numerical operations on the numerical values/signals.

The add-on interface 140 may also easily be configured such that it is able to interpret the signals/information being input to it from the one or more add-on systems 130, e.g. via an external control system network input, such as an external controller area network (CAN) input, of the interface/control unit 148 including the add-on interface 140. The add-on interface 140 may also easily be configured to output signals/information to the one or more add-on systems 130, via the external controller area network (CAN), such that the signals/information may be interpreted/used by the add-on systems 130. The add-on interface 140 may be arranged for converting signaling/information formats being used by the one or more add-on systems 130 to signaling/information formats being used by the one or more vehicle internal systems 120, and vice versa. Hereby, the one or more add-on systems 130 may communicate with the one or more vehicle internal systems 120, and possibly also with other systems, such as systems related to, or being included in the add-on/bodybuilder network 410.

Further, the add-on interface 140 may also be easily configured for interpreting sensor signals being provided by the one or more add-on systems 130, such that a flexibility regarding addition of sensors is achieved for the vehicle. Essentially, any type of sensor, providing any type of sensor signal having essentially any feature, e.g. indicating any type of physical quantity and/or unit, may be implemented in the one or more add-on systems 130, whereby the add-on interface 140 is configured to process the provided sensor signal accordingly. The add-on interface 140 may also be easily configured to output a processed sensor signal having suitable features to the one or more vehicle internal systems 120, such as e.g. to the instrument cluster of the driving compartment, and possibly also to other systems, such as systems/nodes related to, or being included in the add-on/bodybuilder network 410. The add-on interface 140 may for example be configured for outputting sensor signals adapted for being displayed in any suitable vehicle instrument.

The add-on network 410 may include an add-on interface configuration tool 414, which may include an external communication unit 161 arranged for communicating with the at least one internal communication unit 116 included in the vehicle. By use of the add-on interface configuration tool 414, the add-on interface 140 may easily be configured and/or defined, as is described in this document. Information related to how the add-on interface 140 is to be configured/defined may be provided based on input to a manufacturer interface entity 420 and/or a client/user interface entity 430 by a manufacturer and/or a client/user. One or more of the manufacturer interface entity 420 and the client/user interface entity 430 may be implemented as an application (APP) program, as an interface portal, as an interface program, or as any suitable equipment arranged for presenting information and/or for receiving input of information.

An add-on/bodybuilder network 410 may be arranged, e.g. in an internet cloud 160 configuration, for communication and/or configuration of the one or more add-on systems 130, and/or for communication with the manufacturer interface entity 420 and/or the client/user interface entity 430. The add-on network 410 may include a communication node 411, which may include an external communication unit 161 arranged for communicating with the at least one internal communication unit 116 included in the vehicle.

Information transmitted to and/or from the vehicle 100 may have one or more features related to one or more configured functions of the add-on interface 140 and/or related to a configured signaling format used for the connection between the at least one internal communication unit 116 and the at least one external communication unit 161. According to some embodiments, an immutable and unique identifier ID may be created based on, and assigned to, the specific configuration of the add-on interface functions and/or of the used signaling.

Generally, the add-on interface configuration tool 414, the manufacturer interface entity 420 and/or the client/user interface entity 430 is normally unaware of the features of the one or more add-on systems 130 and/or of the configuration of the add-on interface 140. Therefore, the add-on interface configuration tool 414, the manufacturer interface entity 420 and/or the client/user interface entity 430 are often also unaware of how to interpret information provided by the one or more add-on systems 130 to them. The immutable and unique identifier ID may therefore be added, e.g. as included in a packet header, to information sent from the one or more add-on systems 130. The information may then be decoded, in a codec 413 connected to the communication node 411, by usage of this immutable and unique identifier ID. The immutable and unique identifier ID may, after having been previously provided by the add-on interface 140 and/or by the add-on interface configuration tool 414, be stored in a register 412 of the add-on network 410. The codec 413 is arranged for encoding and/or decoding information transmitted from and/or to the vehicle 100, e.g. by usage of the immutable and unique identifier ID, which is then provided to the codec 413 by the register 412.

Thus, the codec 413 may detect the immutable and unique identifier ID in a packet header of information transmitted from the vehicle 100, and may therefore be able to determine the specific configuration of the add-on interface 140 and how to detect the information in the packets. Correspondingly, the immutable and unique identifier ID may also be added, e.g. in a packet header, to information transmitted to the vehicle 100. The add-on interface 140 may then, based on the immutable and unique identifier ID, easily identify to which one or more add-on systems 130 and/or one or more vehicle internal systems 120 the information is intended to be transferred.

One or more diagnosis equipment 440 may be arranged in the add-on network 410 to process diagnosis related information. Such one or more diagnosis equipment may for example be included in the manufacturer interface entity 420 and/or in the client/user interface entity 430, or may be implemented in a separate diagnosis equipment 440. The one or more diagnosis equipment 440 is normally unaware of the features of the possibly unknown one or more add-on systems 130 and/or of the configuration of the add-on interface 140. Therefore, in order to provide a generic diagnosis system, diagnostic identifiers are created based on, and assigned to, the specific configuration of the add-on interface 140 and/or the one or more add-on systems 130. Hereby, the diagnosis equipment 440 may be able to provide a reliable diagnosis also for all add-on systems 130, also for the ones being unknown for the diagnosis equipment.

The person skilled in the art will appreciate that a method for configuring an add-on interface 140 of a vehicle 100 according to the present invention may also be implemented in a computer program, which, when it is executed in a computer, instructs the computer to execute the method. The computer may be included in the herein described system and/or may be coupled/connected to the herein described system. The computer program is usually constituted by a computer program product 503 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 5:
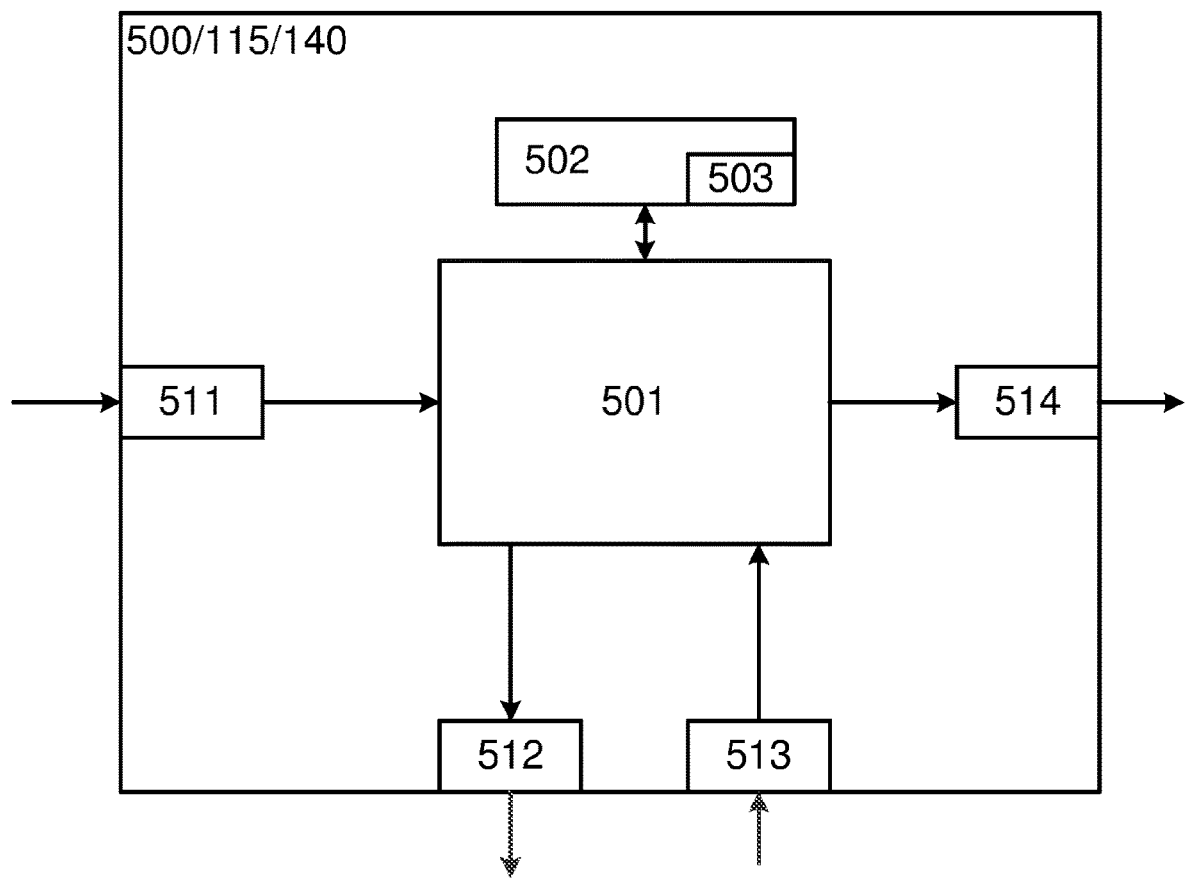
FIG. 5 is a schematic illustration of a control unit according to some embodiments of the present invention.

FIG. 5 shows in schematic representation a control unit/system/means 500/115/148. As mentioned above, the vehicle 100 may include one or more control units 115. Also, the add-on interface 140 may be implemented as a control unit 148. The control unit/system/means 500/115/148 comprises a computing unit 501, which may be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit/system/means 500/115/148, which memory unit provides the computing unit 501 with, for example, the stored program code and/or the stored data which the computing unit 501 requires to be able to perform computations. The computing unit 501 is also arranged to store partial or final results of computations in the memory unit 502.

In addition, the control unit/system/means 500/115/148 is provided with devices 511, 512, 513, 514 for receiving and transmitting input and output signals. These input and output signals may comprise waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, which can be transmitted to other parts of and/or systems within or outside the vehicle 100.

Each of the connections to the devices for receiving and transmitting input and output signals can be comprise one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 501 and that the above-stated memory may be constituted by the memory unit 502.

Control systems in modern vehicles commonly comprise communication bus systems including one or more communication buses for linking a number of electronic control units (ECU's), or controllers, and various components located on the vehicle. Such a control system may comprise a large number of control units/means and the responsibility for a specific function can be divided amongst more than one control unit/means. Vehicles of the shown type thus often comprise significantly more control units/means than are shown in FIGS. 1 and 5, which is well known to the person skilled in the art within this technical field.

In the shown embodiment, the present invention is implemented in the control unit/system/means 500/115/148. The invention can also, however, be implemented wholly or partially in one or more other control units/systems/means already present in the vehicle, or in some control unit/system/means dedicated to the present invention.

According to an aspect of the invention, a control unit 148 is arranged for configuring an add-on interface 140 of a vehicle 100.

The control unit 140 includes a reception unit/means 141, arranged for receiving 210, by usage of the at least one internal communication unit 116, configuration information related to at least one sensor 131 of the vehicle 100 from the at least one vehicle external communication unit 161, as described above.

The control system further includes a configuration unit/means 142, arranged for configuring 220, based on the configuration information, how at least one sensor signal $S_{sensor}$ from the at least one sensor 131 is to be processed by an add-on interface 140, as described above. The add-on interface is, as mentioned above, arranged in the vehicle 100 as an interface between the at least one vehicle internal system 120 and the at least one add-on system 130.

By activation of the above described reception unit/means 141, and configuration unit/means 142, a configuration of the add-on interface is achieved, which has the above-mentioned advantages.

Here and in this document, units/means are often described as being arranged for performing steps of the method according to the invention. This also includes that the units/means are designed to and/or configured to perform these method steps.

The at least one control unit/system/means 148 is in FIG. 1 illustrated as including separately illustrated units/means 141, 142. Also, the control system/means 148 may include or be coupled to e.g. other device/means 115. These means/units/devices 141, 142, 148, 115 may, however, be at least to some extent logically separated but implemented in the same physical unit/device. These means/units/devices 141, 142, 148, 115 may also be part of a single logic unit which is implemented in at least two different physical units/devices. These means/units/devices 141, 142, 148, 115 may also be at least to some extent logically separated and implemented in at least two different physical means/units/devices. Further, these means/units/devices 141, 142, 148, 115 may be both logically and physically arranged together, i.e. be part of a single logic unit which is implemented in a single physical means/unit/device. These means/units/devices 141, 142, 148, 115 may for example correspond to groups of instructions, which can be in the form of programming code, that are input into, and are utilized by at least one processor when the units/means are active and/or are utilized for performing its method step, respectively. It should be noted that the control unit/system/means 148 may be implemented at least partly within the vehicle 100 and/or at least partly outside of the vehicle 100, e.g. in a server, computer, processor or the like located separately from the vehicle 100.

As mentioned above, the units 141, 142 described above correspond to the claimed means 141, 142 arranged for performing the embodiments of the present invention, and the present invention as such.

The control system according to the present invention can be arranged for performing all of the above, in the claims, and in the herein described embodiments method steps. The system is hereby provided with the above described advantages for each respective embodiment.

A skilled person also realizes that the above described system may be modified according to the different embodiments of the method of the present invention. The present invention is also related to a vehicle 100, such as a truck, a bus or a car, including the herein described control unit 148 arranged for configuring an add-on interface.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerized method. The method being, at least in part, computerized meaning that it is performed at least in part with/using/by the at least one device that is suitable and/or adapted for performing at least parts of the inventive method and/or embodiments thereof.

With reference to the above, the inventive method, and embodiments thereof, as described above, may be referred to as an, at least in part, automated method. The method being, at least in part, automated meaning that it is performed with/using/by the at least one device that is suitable and/or adapted for performing at least parts of the inventive method and/or embodiments thereof.

The present invention is not limited to the above described embodiments. Instead, the present invention relates to, and encompasses all different embodiments being included within the scope of the independent claims.

The invention claimed is:

1. A method for configuring an add-on interface to a vehicle, where said vehicle comprises: at least one vehicle internal system; at least one add-on system comprising at least one sensor, where said add-on system is arranged in said vehicle at a time after said vehicle is produced by a manufacturer; and at least one vehicle internal communication unit comprised in a control system network of said vehicle and configured for communication with at least one off-board vehicle external communication unit that is remote from the vehicle, where said add-on interface is arranged in said vehicle as an interface between said at least one vehicle internal system and said at least one add-on system, and wherein the method comprises:

receiving, using said at least one vehicle internal communication unit comprised in the control system network of said vehicle, configuration information related to the at least one sensor of said at least one add-on system transmitted from said at least one off-board vehicle external communication unit; and configuring the add-on interface to process at least one sensor signal $S_{sensor}$ from said at least one sensor of the add-on system based on said configuration information related to the at least one sensor signal $S_{sensor}$ to thereby provide a processed output signal $S_{proc}$ to the at least one vehicle internal system in a form usable by said at least one vehicle internal system.

2. The method as claimed in claim 1, wherein said configuration information comprises information related to at least one input of an interface control unit comprising said add-on interface; and whereby said configuring comprises indicating at least one input of said interface control unit comprising said at least one add-on interface to which said at least one sensor is to be connected.

3. The method as claimed in claim 1, wherein said configuration information comprises information related to at least one first feature of said at least one sensor signal $S_{sensor}$ provided by said at least one sensor; and whereby said configuring comprises defining said at least one sensor signal $S_{sensor}$ to have said at least one first feature.

4. The method as claimed in claim 3, wherein said configuration information comprises information related to at least one second feature of at least one processed signal $S_{proc}$ provided by said add-on interface, respectively; and whereby said configuring comprises defining said at least one processed signal $S_{proc}$ to have said at least one second feature.

5. The method as claimed in claim 1, wherein said configuration information comprises information related to at least one output of an interface control unit comprising said add-on interface; and whereby said configuring comprises indicating at least one output of said interface control unit comprising said at least one add-on interface to which at least one processed signal $S_{proc}$ representing at least one sensor signal $S_{sensor}$, is to be provided.

6. The method as claimed in claim 1, wherein said configuration information related to at least one defined characteristic of said at least one sensor comprises information related to at least one physical quantity and/or unit conversion; and whereby said configuring comprises defining at least one physical quantity and/or unit conversion, which is to be utilized when converting said at least one sensor signal $S_{sensor}$ of a first physical quantity and/or unit to at least one processed signal $S_{proc}$ of a second physical quantity and/or unit.

7. The method as claimed in claim 1, wherein said at least one vehicle external communication unit is comprised in and/or is associated with one or more of:

at least one web and/or internet related unit;
at least one internet cloud related unit;
at least one infrastructure unit;
at least one external communication unit comprised in at least one other vehicle;
at least one server;
at least one database;
at least one processor; and/or
at least one computer.

8. The method as claimed in claim 1, wherein said at least one add-on system is connected to an external control system network input of an interface control unit comprising said add-on interface.

9. The method as claimed in claim 1, wherein said at least one add-on system is a system provided by at least one other part than said manufacturer of said vehicle.

10. The method as claimed in claim 1, wherein said configuration information of said vehicle is received from one or more of:
- a final user of said vehicle;
- at least one other part than said manufacturer, said at least one other part having knowledge of said at least one add-on system; and/or
- said manufacturer.

11. A computer program product comprising computer program code stored on a non-transitory computer-readable medium, said computer program product used for configuring an add-on interface to a vehicle, said vehicle comprises: at least one vehicle internal system; at least one add-on system comprising at least one sensor, where said add-on system is arranged in said vehicle at a time after said vehicle is produced by a manufacturer; and at least one vehicle internal communication unit comprised in a control system network of said vehicle and configured for communication with at least one off-board vehicle external communication unit that is remote from the vehicle, where said add-on interface is arranged in said vehicle as an interface between said at least one vehicle internal system and said at least one add-on system, said computer program code comprising computer instructions to cause one or more control units to perform the following operations:
- receiving, using said at least one internal communication unit comprised in the control system network of said vehicle, configuration information related to at least one sensor of said at least one add-on system transmitted from said at least one off-board vehicle external communication unit; and
- configuring the add-on interface to process at least one sensor signal $S_{sensor}$ from said at least one sensor of the add-on system based on said configuration information related to the at least one sensor signal $S_{sensor}$ to thereby provide a processed output signal $S_{proc}$ to the at least one vehicle internal system in a form usable by said at least one vehicle internal system.

12. A control unit configured for configuring an add-on interface to a vehicle, where said vehicle comprises: at least one vehicle internal system comprised in a control system network of said vehicle; at least one add-on system comprising at least one sensor, where said add-on system is arranged in said vehicle at a time after said vehicle is produced by a manufacturer; and at least one vehicle internal communication unit configured for communication with at least one off-board vehicle external communication unit that is remote from the vehicle, where said add-on interface is arranged in said vehicle as an interface between said at least one vehicle internal system and said at least one add-on system, and wherein the method comprises:
- receiving, using said at least one vehicle internal communication unit comprised in the control system network of said vehicle, configuration information related to the at least one sensor of said at least one add-on system transmitted from said at least one off-board vehicle external communication unit; and
- configuring the add-on interface to process at least one sensor signal $S_{sensor}$ from said at least one sensor of the add-on system based on said configuration information related to the at least one sensor signal $S_{sensor}$ to thereby provide a processed output signal $S_{proc}$ to the at least one vehicle internal system in a form usable by said at least one vehicle internal system.

13. A method for configuring an add-on interface to a vehicle, said vehicle comprising: at least one vehicle internal system; at least one add-on system comprising at least one sensor, said add-on system being arranged in said vehicle after said vehicle is produced by a manufacturer; at least one internal communication unit configured for communication with at least one vehicle external communication unit, wherein the method comprises:
- receiving, using said at least one internal communication unit, configuration information related to at least one sensor of said at least one add-on system from said at least one vehicle external communication unit, wherein said configuration information relates to a defined characteristic of signal output by said at least one sensor, wherein the defined characteristic of signal output by said at least one sensor is one of a: voltage defined signal, a current defined signal, or frequency defined signal, or a phase defined signal; and
- configuring, based on said configuration information, how at least one sensor signal $S_{sensor}$ from said at least one sensor is to be processed by the add-on interface based on the defined characteristic of the signal output by said at least one sensor, respectively, which is to be utilized when interpreting said at least one sensor signal $S_{sensor}$ provided by said at least one sensor, respectively, said add-on interface being arranged in said vehicle as an interface between said at least one vehicle internal system and said at least one add-on system.

* * * * *